United States Patent
Willardsen

(10) Patent No.: US 11,017,438 B2
(45) Date of Patent: May 25, 2021

(54) METHOD AND SYSTEMS FOR AUTOMATIC MANAGEMENT OF SPONSORSHIP OF A USER'S CONTACT INFORMATION

(71) Applicant: John Willardsen, Newport Beach, CA (US)

(72) Inventor: John Willardsen, Newport Beach, CA (US)

(*) Notice: Subject to any disclaimer, the term of this patent is extended or adjusted under 35 U.S.C. 154(b) by 74 days.

(21) Appl. No.: 16/275,331

(22) Filed: Feb. 14, 2019

(65) Prior Publication Data

US 2020/0034886 A1 Jan. 30, 2020

Related U.S. Application Data

(60) Provisional application No. 62/685,276, filed on Jun. 15, 2018.

(51) Int. Cl.
| | |
|---|---|
| *G06Q 30/02* | (2012.01) |
| *A63F 13/795* | (2014.01) |
| *A63F 13/61* | (2014.01) |
| *A63F 13/87* | (2014.01) |

(52) U.S. Cl.
CPC ......... *G06Q 30/0271* (2013.01); *A63F 13/61* (2014.09); *A63F 13/795* (2014.09); *A63F 13/87* (2014.09); *G06Q 30/0267* (2013.01); *G06Q 30/0277* (2013.01)

(58) Field of Classification Search
CPC ........... G06Q 30/0271; G06Q 30/0277; G06Q 30/0267; A63F 13/795; A63F 13/61; A63F 13/87

USPC ........................................... 705/14.67, 14.64
See application file for complete search history.

(56) References Cited

U.S. PATENT DOCUMENTS

2015/0170210 A1* 6/2015 Rhee ................... H04M 3/4878
705/14.64

FOREIGN PATENT DOCUMENTS

WO WO-2009102049 A1 * 8/2009 ............. G06Q 30/02

OTHER PUBLICATIONS

Trent Munro, Datamatrix and QR codes: why 2D codes are still relevant in 2016 (Year: 2016).*

* cited by examiner

*Primary Examiner* — Tarek Elchanti

(57) ABSTRACT

In one aspect, a computerized method for implementing a contact management system for automatic management of a user's contact information includes the step of providing a contact management system that is used to manage a user's contact information; associating a sponsor with the user of the contact management system. The method includes the step of receiving a request to share the user's contact information to another user's contact list in another user's computing device. The method includes the step of integrating a sponsor advertisement into the user's contact information. The method includes the step of transferring the user's contact information and the sponsor advertisement to the other user's computing device.

10 Claims, 8 Drawing Sheets

METHOD AND SYSTEMS FOR AUTOMATIC MANAGEMENT OF SPONSORSHIP OF A USER'S CONTACT INFORMATION

CROSS-REFERENCE TO RELATED APPLICATIONS

This application is a claims priority from U.S. Provisional Patent Application No. 62/685,276, filed on Jun. 15, 2018. This application is hereby incorporated by reference in its entirety.

FIELD OF THE INVENTION

The invention is in the field of digital contact lists and electronic messaging systems and more specifically to a method, system and apparatus of automatic management of sponsorship of a user's contact information.

DESCRIPTION OF THE RELATED ART

Mobile devices often include contact lists in various applications. Users often share contact information and use the contact information to make phone calls, send text messages, etc. In this way, a user will view and interact with an application page that includes another user's contact information each time the user call the other user. User views are marketing opportunities. Accordingly, improvements to the display of user contact information to include sponsorships are desired.

BRIEF SUMMARY OF THE INVENTION

In one aspect, a computerized method for implementing a contact management system for automatic management of a user's contact information includes the step of providing a contact management system that is used to manage a user's contact information; associating a sponsor with the user of the contact management system. The method includes the step of receiving a request to share the user's contact information to another user's contact list in another user's computing device. The method includes the step of integrating a sponsor advertisement into the user's contact information. The method includes the step of transferring the user's contact information and the sponsor advertisement to the other user's computing device.

Figure 1:
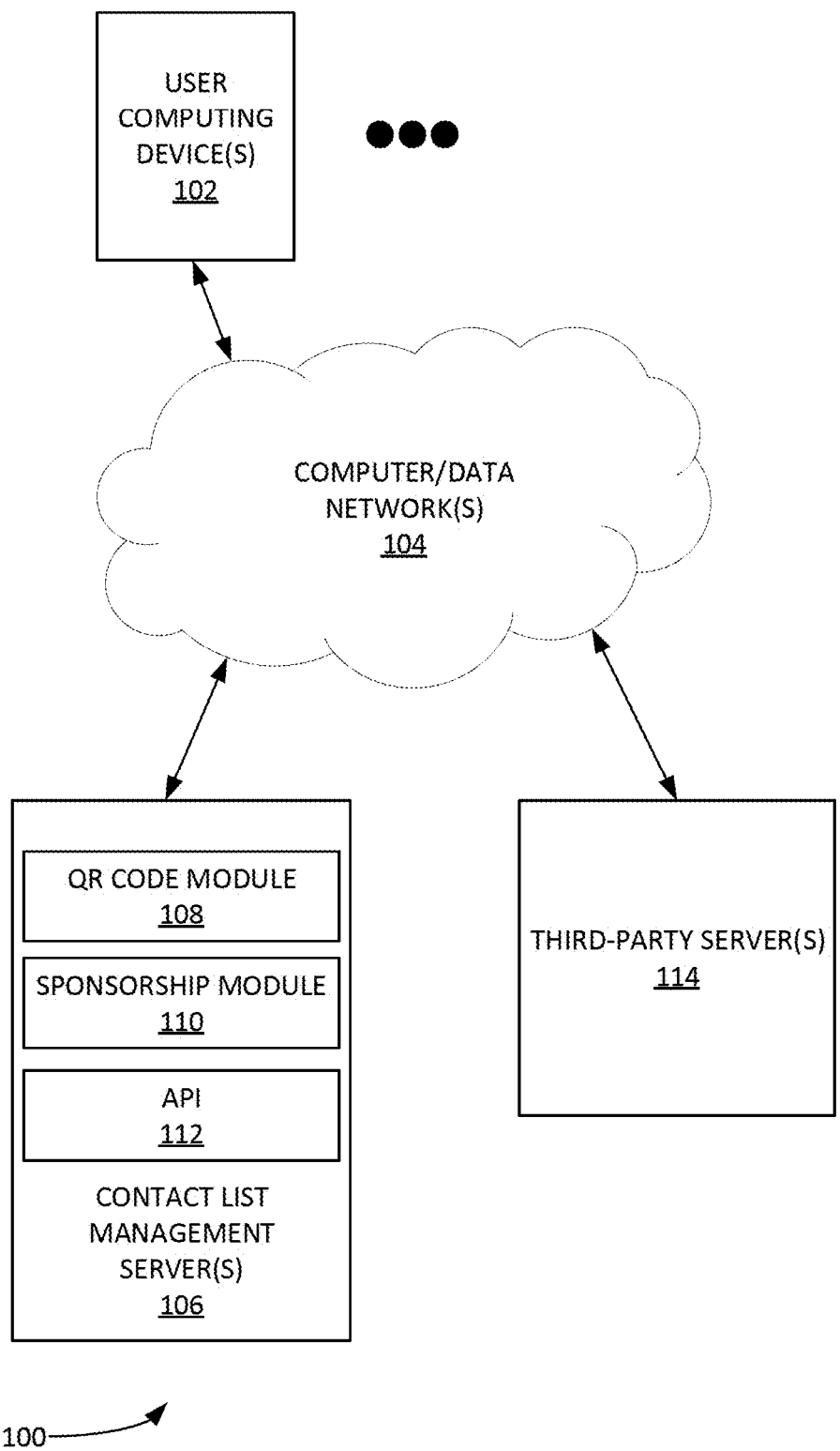
FIG. 1 illustrates an example system for automatic management of a user's contact information, according to some embodiments.

The Figures described above are a representative set and are not an exhaustive with respect to embodying the invention.

DESCRIPTION

Disclosed are a system, method, and article of manufacture for automatic management of sponsorship of a user's contact information. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' an 'embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Contact list is a collection of screen names. It can be a feature of instant messaging, Email clients, online games, mobile phones, etc.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Matrix code (e.g. a 2D barcode) can be a two-dimensional way to represent information.

QR code (Quick Response Code) is a type of matrix barcode (or two-dimensional barcode).

Example Systems

A computerized contact management system for automatic management of a user's contact information is provided. The contact management system can also be used to manage a user's profile information. The contact management system can enable a user to choose one or more sponsors. Sponsors can be corporate enterprises, non-profit entities, educational entities, sports teams, religious institutions, and the like. When a sponsor is selected, the contact management system can send an electronic communication (e.g. an email, text message, push notification, etc.) alerting the sponsor of the user's sponsorship.

The contact management system can also enable various users to share data/content/contacts easily between user-side computing devices (e.g. smart phones, tablet computers, wearable devices, etc.). For example, the contact management system can provide a user-side application that generates a QR code. The QR code can be associated with relevant user data/content/contact information. The QR code can be used to upload said user data/content/contact information to another user-side computing device.

The contact management system can enable the user to modify and/or otherwise select which user data/content/contact information to share via a dynamic QR code. For example, depending on which data user choses to share the QR code can be updated in real-time to share only the selected user data/content/contact information. In this way, the contact information sharing QR codes can be generated on the fly (e.g. assuming processing and networking latencies) by the user-side application.

The user data/content/contact information can include, inter alia: the user's name, the user's name phone number, various user email addresses, various user websites, user sponsors, user interests, user video sharing website (e.g. YouTube®, etc.) hyperlinks, online social media profile, etc.

The contact management system can implement universal changes to the user's contact information. In this way, a user can modify his/her contact information in the contact lists of other users. These changes can permeate throughout the contact management system and/or a subset of said system. —For example, a user can swipe away his/her contact information and user-side application changes the QR code in real time. For example, a user can swipe out his Facebook and home address in real time before providing a QR code to another user to scan. The other user can then have the user's contact information minus the swiped data. The contact management system enable user to print out QR codes offline (e.g. onto business products, business cards, mailers, etc.).

It is noted that a contact list is not static, but rather a dynamic data list that can be updated by users. For example, a user can change various contact details on his contact list and those contact details will automatically be updated in the contact lists universally through all of the user's contact's contact lists. In this way, the users can control how their contact list is updated and/or otherwise appears to others. A user can retract contact details as relationship changes and/or can add new information as well. In one example, contacts can be displays as wheels of different profiles with each layer providing a differentiation in information shared by a user. A user can provide different contact profiles for different relationship types (e.g. a professional contact list, a hobby-related contact list, an educational-related contact list, a family contact list, a location-based contact list, a client-based contact list, etc.). These can be subsets of the master contact list. The user can implement dynamic changes to specific contacts/within subsets. Each subset can have access to specifically curated data about the user. The user can make a subset of one's contact list public to share with others.

Users can designate sponsors of their contract information. Sponsors can leverage this information for promos, coupons, introductions, linking sponsored users, etc. In one example, micro cells of sponsored users can share specific subsets of information. Sponsored users can be searchable within the contact management system. In this way, user can link up based on common sponsorships and/or other user attributes.

FIG. 1 illustrates an example system for automatic management of a user's contact information, according to some embodiments.

Networks 104 can include the Internet, text messaging networks (e.g. short messaging service (SMS) networks, multimedia messaging service (MMS) networks, proprietary messaging networks, instant messaging service networks, email servers, etc. Networks 104 can be used to communicate messages and/or other information from the various entities of system 100. In one implementation, networks 104 may be a wireless network, a wired network or a combination thereof. Networks 104 can be implemented as one of the different types of networks, such as intranet, local area network (LAN), wide area network (WAN), the internet, and the like. Networks 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the networks 104 may include a variety of network devices, including routers, bridges, servers, computing devices, storage devices, and the like.

User-computing devices 102 can be any computing device used by a user to access/consume contact-list content provided by system 100 (e.g. via contact-list management server 106). Example user-computing devices can include, inter alia: personal computers, mobile devices, augmented reality devices, virtual reality devices, tablet computers, etc. User-computing devices 102 can include a contact-list management application. User-computing devices 102 can enable a user to upload contact list data and/or manage the visibility of the user's contact list data to various subsets of contacts. User-computing devices 102 can enable a user to communicate with sponsors and/or receive promotions from sponsors. User-computing devices 102 can display various QR codes generated by the contact-list management application and/or QR code module 108 in contact-list management server 104. In this way, users can share contact details and/or other relevant information.

Contact-list management server 104 can implement the server-side functionalities of the contact-list management system provided supra. Contact-list management server 104 can implement the server-side functionalities of process 400-600. Contact-list management server 104 can implement universal updates of user contact information. Contact-list management server 104 provide the ability to update information universally within the user's network and contact list. Once the user updates information, it is universal to all users who share the updated profile if the user chooses.

Sponsorship module 110 can manage the various user-selected sponsorships. Sponsorship module 110 can inform sponsors of their sponsored users (e.g. via API 112). Third-party servers 114 can include sponsor servers, search engines, data-base management systems, etc. As noted, sponsorship can be a state where a user (a sponsee) selects their chosen sponsors. The sponsors can have brands that represent the sponsee user. The sponsor is alerted by the sponsorship module 110 of the sponsee's selection. The sponsor can cross promote and send promotions and notifications of promotions. The sponsee can then receive promotions and benefits for selecting them as a sponsor. As the sponsee promotes and markets the sponsor, the sponsee increases their value to the sponsor which the sponsor can reward the sponsee however they prefer, with points, product, monetary gain or even share in the sponsor company distributed to the sponsee. The sponsee can choose to invest in the companies whom they have chosen as their sponsor. Sponsorship module 110 can manage a set up where when a sponsee user makes a purchase at a store, the sponsee can round up their purchases to the nearest dollar and use the excess to invest in said sponsor company.

Figure 2:
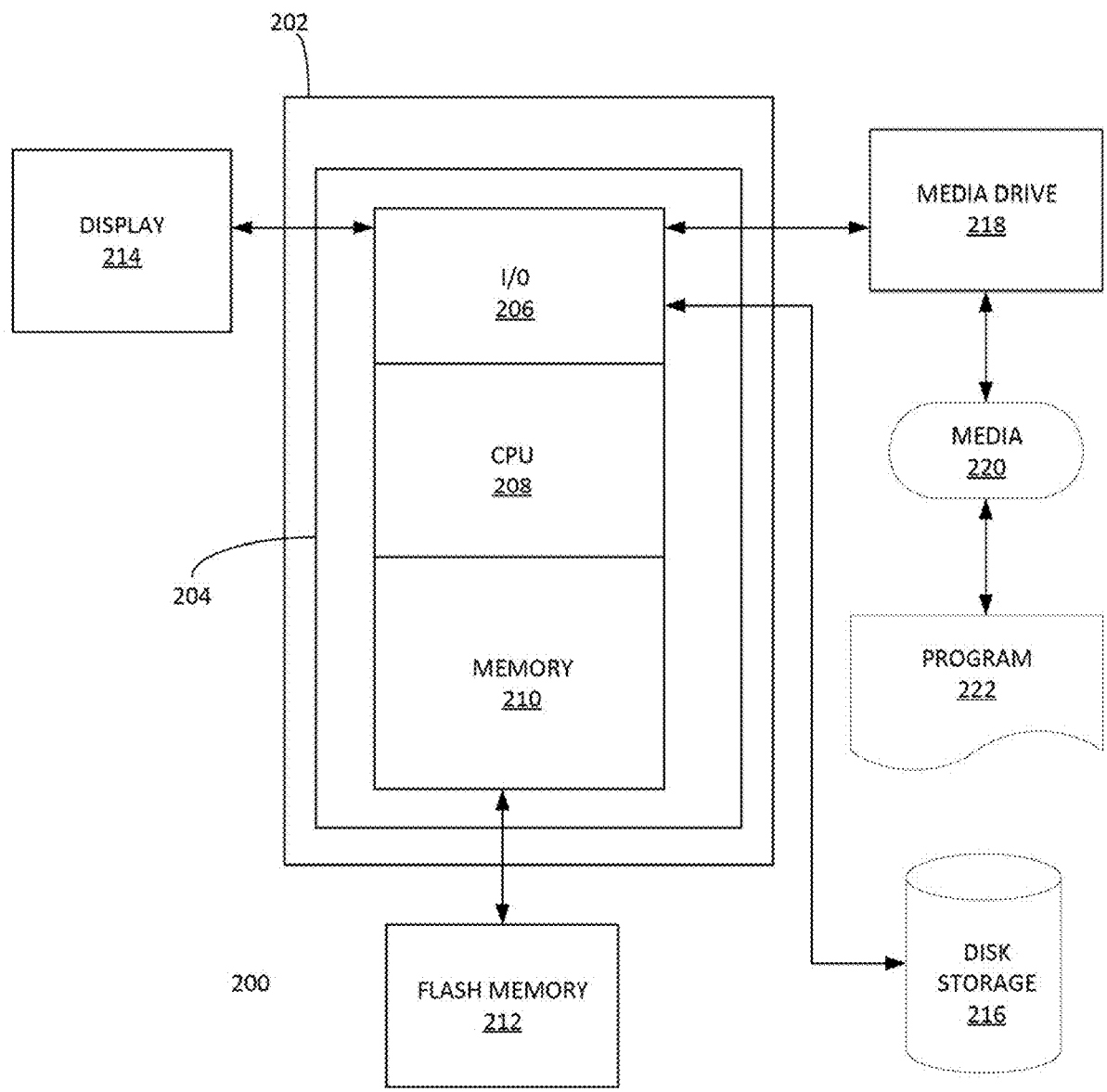
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities.

Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
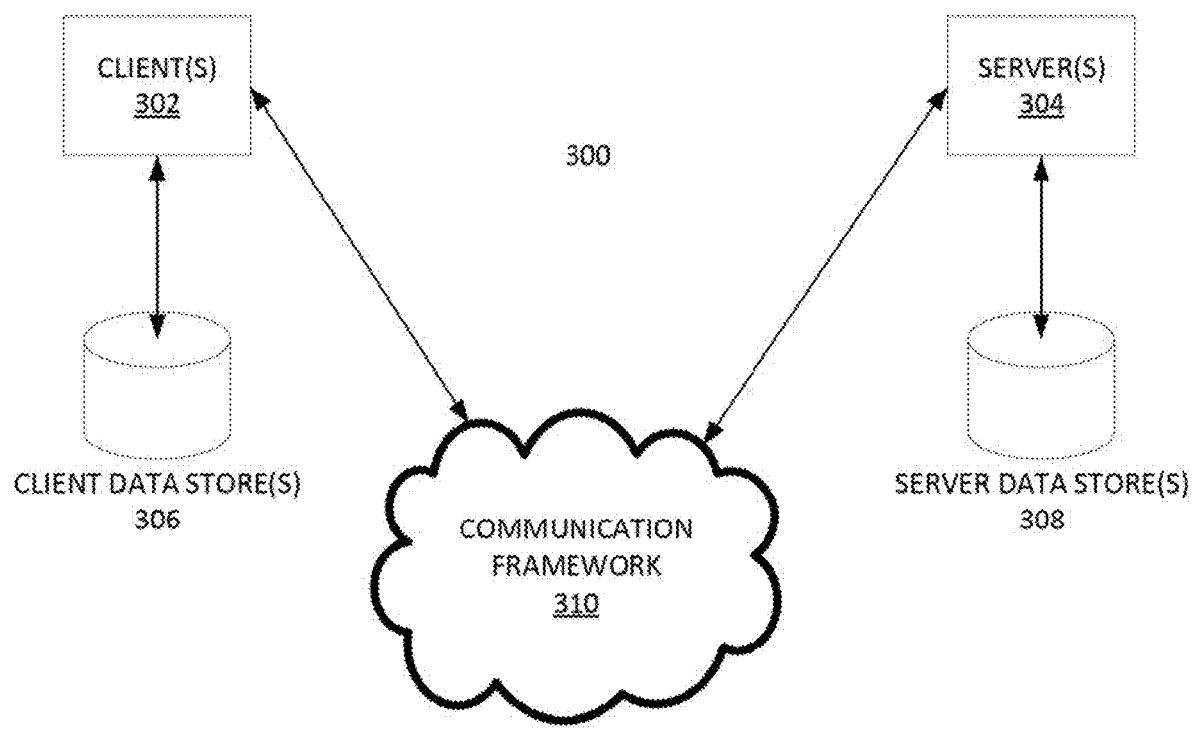
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes an orchestration framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Example Processes

Figure 4:
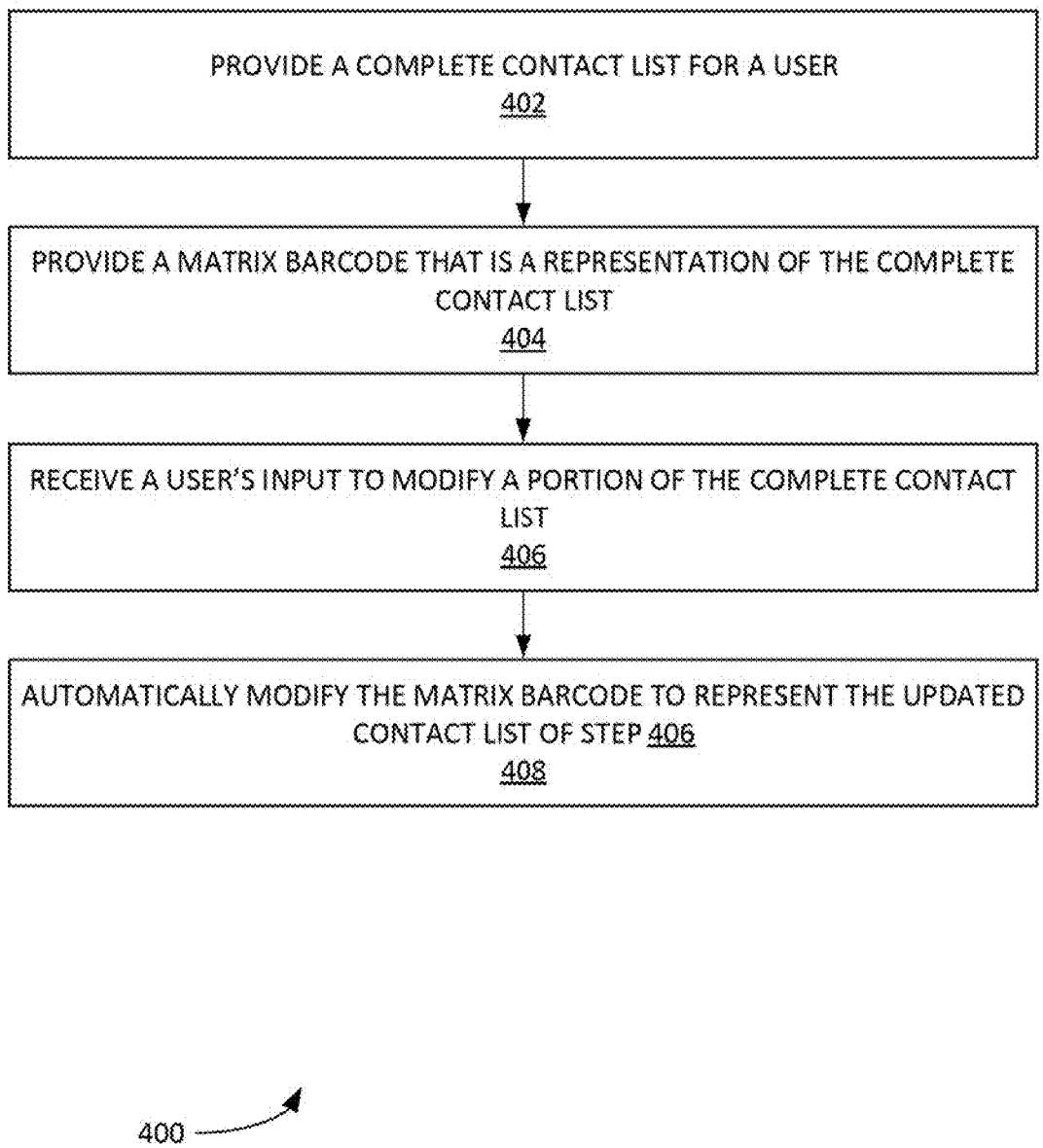
FIG. 4 illustrates an example process of a dynamic matrix barcode representing a user's contact list, according to some embodiments.

FIG. 4 illustrates an example process 400 of a dynamic matrix barcode representing a user's contact list, according to some embodiments. In step 402, process 400 can provide a complete contact list for a user. In step 404, process 400 can provide a matrix barcode that is a representation of the complete contact list. In step 406, process 400 can receive a user's input to modify a portion of the complete contact list. In step 408, process 400 can automatically modify the matrix barcode to represent the updated contact list of step 406.

Figure 5:
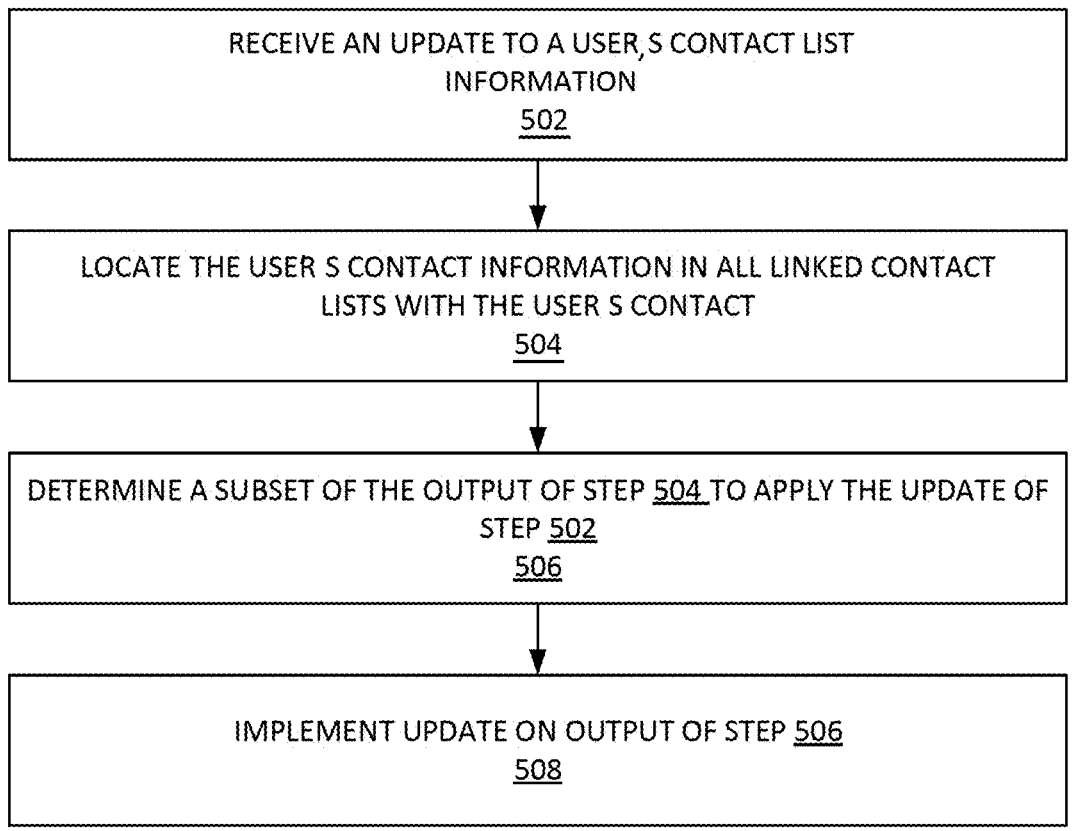
FIG. 5 illustrates an example process of a universally updating a user's contact list across a set of user's contacts, according to some embodiments.

FIG. 5 illustrates an example process 500 of a universally updating a user's contact list information across a set of user's contacts in other user's contact lists, according to some embodiments. In step 502, process 500 can receive an update to a user's contact list information. In step 504, process 500 can locate the user's contact list in all linked contact lists with the user's contact. In step 506, process 500 can determine a subset of the output of step 504 to apply the update of step 502. In step 508, process 500 can implement update on output of step 506.

Figure 6:
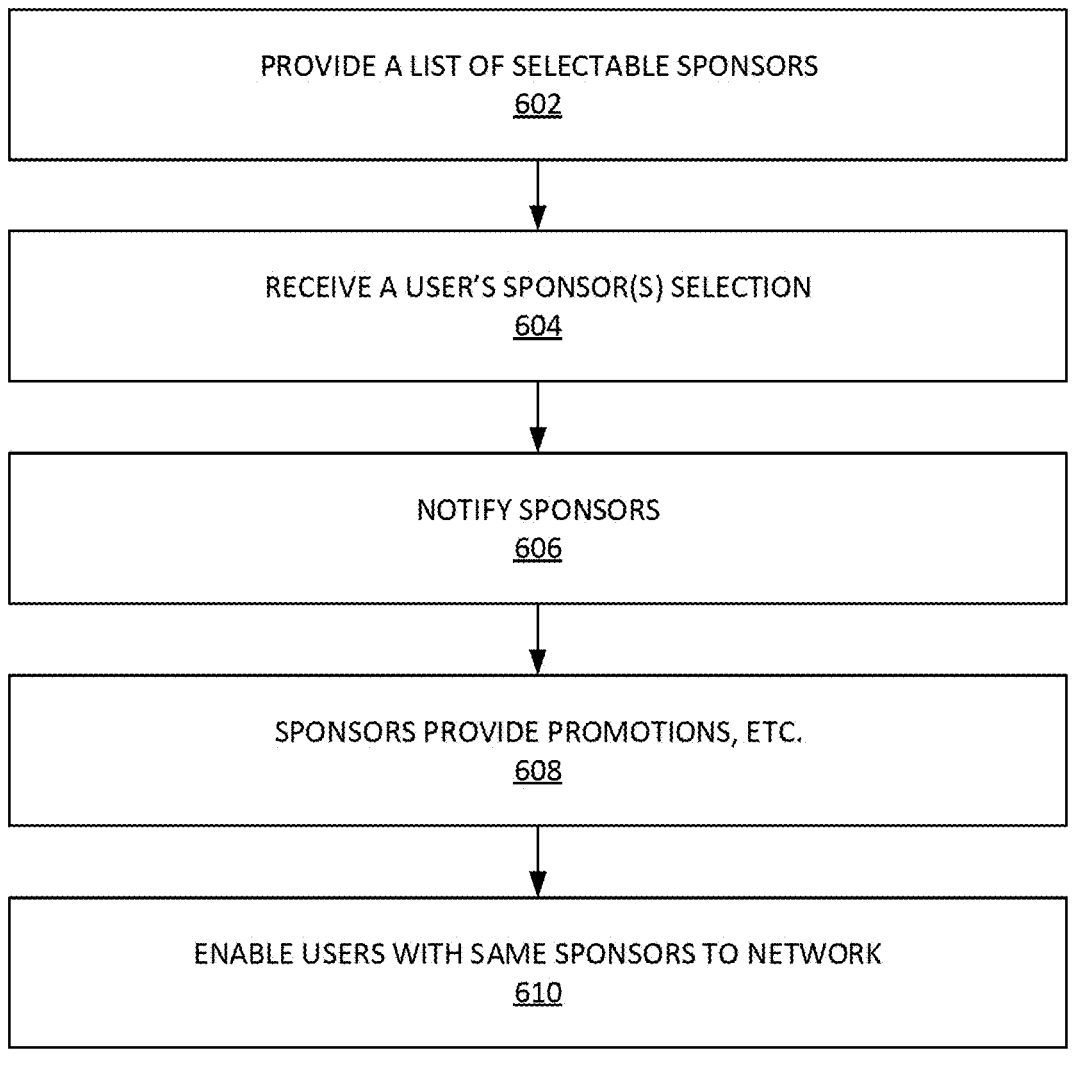
FIG. 6 illustrates an example process for enabling contact list user to manage sponsorships, according to some embodiments.
Figure 7A:
FIGS. 7 A-F illustrate example screen shots implemented by the systems and processes provided herein, according to some embodiments.
Figure 7B:
Figure 7C:
Figure 7D:
Figure 7E:
Figure 7F:
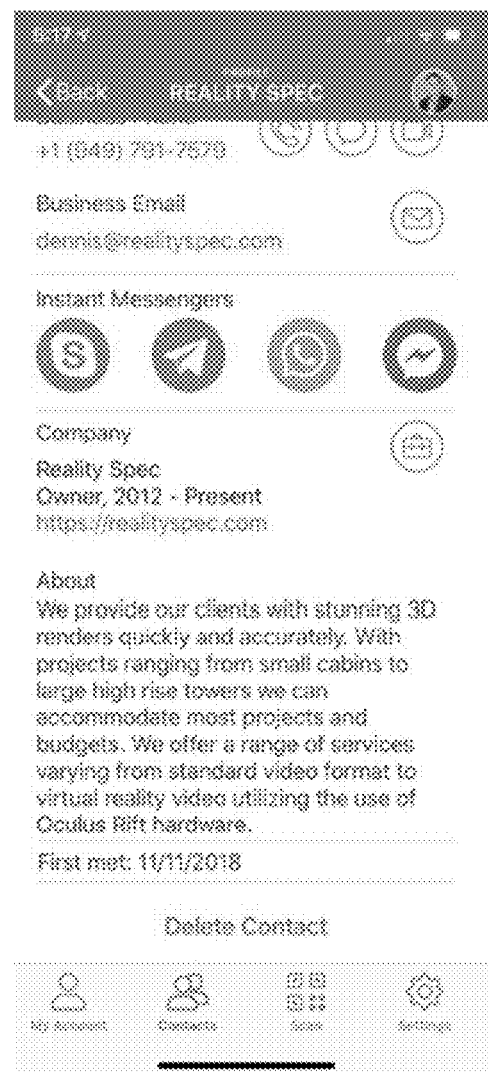

FIG. 6 illustrates an example process 600 for enabling contact list user to manage sponsorships, according to some embodiments. In step 602, process 600 can provide a list of selectable sponsors. In step 604, process 600 can receive a user's sponsor(s) selection. In step 606, process 600 can notify sponsors. In step 608, process 600 can enable sponsors to provide promotions, etc. In step 610, process 600 can enable users with same sponsors to network and/or other otherwise interact.

Example Screen Shots

FIGS. 7 A-F illustrate example screen shots implemented by the systems and processes provided supra, according to some embodiments. Furthermore, it is noted that sharing via dynamic QR code (and/or other matrixcodes). As respective content changes, the QR code changes accordingly. The system can also implement delayed messaging (e.g. text, email and voicemail, etc.). In this way, a message can be created at any time then sent at time allotted, (e.g. message created at 11:30 pm, and set up to send at 8:30 am next day). Additionally, in a contact list application, a user can swipe right or left for the different profiles. For example, each user can have various profiles that represent the business the user is representing, swiping right or left between different profiles of individual users.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for implementing a contact management system for automatic management of a user's contact information comprising:
    providing a that is used to manage a user's contact information comprising a mobile device contact list, wherein the contact management system is implemented as a mobile device application within a mobile device of the user;
    associating a sponsor with the user of the contact management system;
    receiving a request to share the user's contact information to another user's contact list in another user's computing device;
    enabling the user to dynamically modify a subset of the user contact information to share;
    integrating a sponsor advertisement into the user's contact information;
    generating a dynamic matrix barcode, wherein the dynamic matrix barcode comprises the user's contact information, and wherein the dynamic matrix code is generated by the contact management system, and wherein the dynamic matrix code is used to upload said user contact information to another user-side computing device;
    displaying the dynamic matrix barcode;
    based on a user a user's input, receiving a dynamic modification of the user's contact information to include only a subset of the user contact information as indicated by the user;
    integrating another sponsor advertisement into the subset of the user's contact information;
    automatically regenerating the dynamic matrix barcode, wherein the dynamic matrix barcode comprises the subset of user's contact information, and wherein the matrix code is dynamically generated by the contact management system in real-time once the user has modified the user's contact information to include the subset of user's contact information, and wherein the dynamic matrix code is used to upload said subset of user contact information to another user-side computing device;
    transferring the subset of the user's contact information and the other sponsor advertisement to the other user's computing device in a format of the dynamic matrix barcode;
    communicating the user contact information and a notification that the user has selected the sponsor to a sponsor-managed server system;
    storing the user contact information in the other user's computing device in the dynamic matrix barcode;
    detecting a change to the user contact information in the contact management system within the mobile device of the user; and
    automatically updating the dynamic matrix barcode in the other user's computing device to include the change to the user contact information.

2. The computerized method of claim 1, wherein a sponsor comprises a corporate enterprise, a non-profit entity, an educational entity, a sports team or a religious institution.

3. The computerized method of claim 2, wherein the contact list comprises an online gaming platform contact list.

4. The computerized method of claim 1,
    wherein the contact management system also transfers specified set of user digital photographs and files to the other user's computing device; and
    wherein the other user's computing device comprises a smart phone.

5. The computerized method of claim 1 further comprising:
    wherein the user's contact information is linked in all the contact lists shared by the user,
    receiving an update to a user's contact information,
    locating the user s contact information in all the contact lists; and
    updating the user's contact information in the all contact lists.

6. A mobile-device system for implementing a contact management system for automatic management of a user's contact information comprising:
    a processor;
    a memory containing instructions when executed on the processor, causes the processor to perform operations that:
        provide a contact management system that is used to manage a user's contact information comprising a mobile device contact list, wherein the contact management system is implemented as a mobile device application within a mobile device of the user;
        associate a sponsor with the user of the contact management system;
        receive a request to share the user's contact information to another user's contact list in another user's computing device;
        enable the user to dynamically modify a subset of the user contact information to share;
        integrate a sponsor advertisement into the user's contact information;
        generate a dynamic matrix barcode, wherein the dynamic matrix barcode comprises the user's contact information, and wherein the dynamic matrix code is generated by the contact management system, and wherein the dynamic matrix code is used to upload said user contact information to another user-side computing device;

display the dynamic matrix barcode;

based on a user a user's input, receive a dynamic modification of the user's contact information to include only a subset of the user contact information as indicated by the user;

integrate another sponsor advertisement into the subset of the user's contact information;

automatically regenerate the dynamic matrix barcode, wherein the dynamic matrix barcode comprises the subset of user's contact information, and wherein the matrix code is dynamically generated by the contact management system in real-time once the user has modified the user's contact information to include the subset of user's contact information, and wherein the dynamic matrix code is used to upload said subset of user contact information to another user-side computing device;

transfer the subset of the user's contact information and the other sponsor advertisement to the other user's computing device in a format of the dynamic matrix barcode;

communicate the user contact information and a notification that the user has selected the sponsor to a sponsor-managed server system store the user contact information in the other user's computing device in the dynamic matrix barcode;

detect a change to the user contact information in the contact management system within the mobile device of the user; and automatically update the dynamic matrix barcode in the other user's computing device to include the change to the user contact information.

7. The mobile-device system of claim 6, wherein a sponsor comprises a corporate enterprise, a non-profit entity, an educational entity, a sports team or a religious institution.

8. The mobile-device system of claim 7, wherein the contact list comprises an online gaming platform contact list.

9. The mobile-device system of claim 6, wherein the contact management system also transfers specified set of user digital photographs and files to the other user's computing device; and wherein the other user's computing device comprises a smart phone.

10. The mobile-device system of claim 6, wherein the memory further contains instructions that when executed on the processor, causes the processor to perform operations that:

wherein the user's contact information is linked in all the contact lists shared by the user, receive an update to a user's contact information, locate the user s contact information in all the contact lists; and update the user's contact information in the all contact lists.

\* \* \* \* \*